(12) United States Patent
Mitsui

(10) Patent No.: US 8,320,001 B2
(45) Date of Patent: Nov. 27, 2012

(54) INFORMATION PROCESSING METHOD AND APPARATUS FOR BANNER PRINTING

(75) Inventor: Akihiro Mitsui, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 923 days.

(21) Appl. No.: 12/406,843

(22) Filed: Mar. 18, 2009

(65) Prior Publication Data
US 2009/0244585 A1 Oct. 1, 2009

(30) Foreign Application Priority Data

Mar. 25, 2008 (JP) ................................ 2008-079213

(51) Int. Cl.
*G06F 3/12* (2006.01)
(52) U.S. Cl. ........ 358/1.15; 358/1.9; 358/1.13; 358/1.18
(58) Field of Classification Search ........................ None
See application file for complete search history.

(56) References Cited

U.S. PATENT DOCUMENTS

| | | | | |
|---|---|---|---|---|
| 5,547,178 | A * | 8/1996 | Costello | 270/52.02 |
| 7,038,803 | B2 * | 5/2006 | Kimble | 358/1.15 |
| 7,839,531 | B2 * | 11/2010 | Sugiyama | 358/1.18 |
| 7,855,800 | B2 * | 12/2010 | Forlenza et al. | 358/1.15 |
| 8,085,429 | B2 * | 12/2011 | Nishikawa et al. | 358/1.18 |
| 2002/0075497 | A1 * | 6/2002 | Mantell | 358/1.13 |
| 2002/0089689 | A1 * | 7/2002 | Ferlitsch et al. | 358/1.15 |
| 2003/0020957 | A1 * | 1/2003 | Brewster | 358/3.28 |
| 2004/0114184 | A1 * | 6/2004 | Sugiyama | 358/1.18 |
| 2004/0257606 | A1 * | 12/2004 | Bergstrand et al. | 358/1.15 |
| 2005/0270550 | A1 * | 12/2005 | Sumio | 358/1.13 |
| 2006/0023244 | A1 | 2/2006 | Mitsui | |
| 2006/0152757 | A1 * | 7/2006 | Forlenza et al. | 358/1.15 |
| 2007/0177207 | A1 * | 8/2007 | Ahmad | 358/1.18 |
| 2009/0097047 | A1 | 4/2009 | Mitsui | |

FOREIGN PATENT DOCUMENTS

JP 2002-328786 11/2002
JP 2007-207235 A 8/2007

OTHER PUBLICATIONS

"JobPrimaryBannerSheet" (Print Schema Specification), as found at http://msdn.microsoft.com/en-us/library/ms716445 (VS.85,printer). aspx, Mar. 3, 2009.
Japanese Office Action dated Apr. 16, 2012 issued in corresponding Japanese Patent Application No. 2008-079213.

* cited by examiner

*Primary Examiner* — Dung Tran
(74) *Attorney, Agent, or Firm* — Fitzpatrick, Cella, Harper & Scinto

(57) ABSTRACT

When a setting corresponding to a setting item for generating a banner sheet for banner printing by the printer driver of the printer is made, print setting information including information representing that a banner sheet is to be generated is generated in accordance with the setting. Based on the generated print setting information, banner data for generating a banner sheet is generated. Information for using the generated banner data as banner data for print data, printing of which is designated by the application, is additionally described in the print setting information.

9 Claims, 13 Drawing Sheets

FIG. 5

```xml
<psf:Feature name="psk:JobPrimaryBannerSheet">
  <psf:Option name="psk:Custom">
    <psf:ScoredProperty name="psk:BannerSheetSource">
      <psf:ParameterRef name="psk:JobPrimaryBannerSheetSource"/>
    </psf:ScoredProperty>
  </psf:Option>
</psf:Feature>
<psf:ParameterInit name="psk:JobPrimaryBannerSheetSource">
  <psf:Value xsi:type="xs:string"></psf:Value>  ~ 501
</psf:ParameterInit>
<psf:Feature name="ns0000:JobPrimaryBannerSheetCoreProperties">
  <psf:Option name="ns0000:lastModifiedBy">
    <psf:Property name="ns0000:PrintingName">
      <psf:Value xsi:type="xs:string">lastSavedBy</psf:Value>
    </psf:Property>
  </psf:Option>
  <psf:Option name="ns0000:revision">
    <psf:Property name="ns0000:PrintingName">
      <psf:Value xsi:type="xs:string">Revision Number</psf:Value>
    </psf:Property>
  </psf:Option>
</psf:Feature>
```

FIG. 7

```xml
<psf:Feature name="psk:JobPrimaryBannerSheet">
  <psf:Option name="psk:Custom">
    <psf:ScoredProperty name="psk:BannerSheetSource">
      <psf:ParameterRef name="psk:JobPrimaryBannerSheetSource"/>
    </psf:ScoredProperty>
  </psf:Option>
</psf:Feature>
<psf:ParameterInit name="psk:JobPrimaryBannerSheetSource">
  <psf:Value xsi:type="xs:string">/Documents/1/Pages/0.banner</psf:Value>
</psf:ParameterInit>
<psf:Feature name="ns0000:JobPrimaryBannerSheetCoreProperties">
  <psf:Option name="ns0000:lastModifiedBy">
    <psf:Property name="ns0000:PrintingName">
      <psf:Value xsi:type="xs:string">lastSavedBy</psf:Value>
    </psf:Property>
  </psf:Option>
  <psf:Option name="ns0000:revision">
    <psf:Property name="ns0000:PrintingName">
      <psf:Value xsi:type="xs:string">Revision Number</psf:Value>
    </psf:Property>
  </psf:Option>
</psf:Feature>
```

FIG. 9

```
<cp:coreProperties xmlns:cp="http://schemas.openxmlformats.org/pack
age/2006/metadata/core-properties" xmlns:dc="http://purl.org/dc/elements
/1.1/" xmlns:dcterms="http://purl.org/dc/terms/" xmlns:dcmitype="http://
purl.org/dc/dcmitype/" xmlns:xsi="http://www.w3.org/2001/XMLSchema-
instance">
    <dc:title>Test Document</dc:title>
    <dc:creator>Administrator</dc:creator>
    <dc:lastModifiedBy>Test User</dc:lastModifiedBy>
    <dc:revision>13</dc:revision>
    <dcterms:created xsi:type="dcterms:W3CDTF">2007-06-26T09:36:03
Z</dcterms:created>
    <dcterms:modified xsi:type="dcterms:W3CDTF">2007-06-26T09:36:0
3Z</dcterms:modified>
</cp:coreProperties>
```

FIG. 10

```
<FixedPage xmlns="http://schemas.microsoft.com/xps/2005/06" Width="794" Height=
   "1123"xml:lang="ja-JP">
  <Canvas>
    <Canvas.RenderTransform><MatrixTransform Matrix="1.333333333,0,0,1.333333333,
0,0"/></Canvas.RenderTransform>
      <Glyphs Name="a12" BidiLevel="0" Fill="#FF000000" FontUri="/Resources/4A3C20A1
-268A-0631-B649-2C576D68B402.odttf" FontRenderingEmSize="10.56" StyleSimulations
="None" OriginX="262.97" OriginY="328.37" UnicodeString="Administrator" Indices=",71.59
1;,57.955;,88.636;,30.682;,61.364;,30.682;,46.591;,38.636;,44.318;,55.682;,38.636;,50;" xml:
land="en-US"></Glyphs>
      <Glyphs Name="a14" BidiLevel="0" Fill="#FF000000" FontUri="/Resources/4A3C20A1
-268A-0631-B649-2C576D68B402.odttf" FontRenderingEmSize="10.56" StyleSimulations
="None" OriginX="278.09" OriginY="346.37" UnicodeString="Test.doc" Indices=",57.955;,50;,
46.591;,38.636;,26.136;,57.955;,50;" xml:lang="en-US"></Glyphs>
      <Glyphs Name="a16" BidiLevel="0" Fill="#FF000000" FontUri="/Resources/797418F0
-36E9-4778-3249-423F0D6BA87E.odttf" FontRenderingEmSize="10.56" StyleSimulations
="None" OriginX="246.77" OriginY="364.13" UnicodeString="lastSavedBy" Indices=",100;,100;,
98.864;,100;"></Glyphs>
      <Glyphs Name="a17" BidiLevel="0" Fill="#FF000000" FontUri="/Resources/4A3C20A1
-268A-0631-B649-2C576D68B402.odttf" FontRenderingEmSize="10.56" StyleSimulations
="None" OriginX="299.45" OriginY="364.13" UnicodeString=": TestUser" Indices=",27.273;,2
6.136;,57.955;,50;,46.591;,37.5;,81.818;,45.455;,50;"></Glyphs>
      <Glyphs Name="a19" BidiLevel="0" Fill="#FF000000" FontUri="/Resources/797418F0
-36E9-4778-3249-423F0D6BA87E.odttf" FontRenderingEmSize="10.56" StyleSimulations
="None" OriginX="267.89" Originy="382.13" UnicodeString="Revision Number" Indices=",100;,100;,98.
864;"></Glyphs>
      <Glyphs Name="a20" BidiLevel="0" Fill="#FF000000" FontUri="/Resources/4A3C20A1
-268A-0631-B649-2C576D68B402.odttf" FontRenderingEmSize="10.56" StyleSimulations
="None" OriginX="310.03" OriginY="382.13" UnicodeString=": 13" Indices=",27.273;,27.273;,
55.682;"></Glyphs>
  </Canvas>
</FixedPage>
```

FIG. 11

```
<FixedDocument xmlns="http://schemas.microsoft.com/xps/2005/06">
    <PageContent Source="Pages/0.banner">
    </PageContent>
    <PageContent Source="Pages/1.fpage">
    </PageContent>
    <PageContent Source="Pages/2.fpage">
    </PageContent>
    <PageContent Source="Pages/3.fpage">
    </PageContent>
    <PageContent Source="Pages/4.fpage">
    </PageContent>
    <PageContent Source="Pages/5.fpage">
    </PageContent>
</FixedDocument>
```

FIG. 12

```xml
<DocumentStructure
xmlns="http://schemas.microsoft.com/xps/2005/06/documentstructure">
  <DocumentStructure.Outline>
    <DocumentOutline xml:lang="ja-JP">
      <OutlineEntry OutlineLevel="1" Description="CHANGE LOG"
      OutlineTarget="../FixedDoc.fdoc#PG_2_LNK_124"/>
      <OutlineEntry OutlineLevel="1" Description="OUTLINE"
      OutlineTarget="../FixedDoc.fdoc#PG_13_LNK_125"/>
      <OutlineEntry OutlineLevel="2" Description="PURPOSE"
      OutlineTarget="../FixedDoc.fdoc#PG_14_LNK_126"/>
      <OutlineEntry OutlineLevel="2" Description="FUNCTION"
      OutlineTarget="../FixedDoc.fdoc#PG_15_LNK_127"/>
      <OutlineEntry OutlineLevel="1" Description="DATA STRUCTURE"
      OutlineTarget="../FixedDoc.fdoc#PG_15_LNK/128"/>
      <OutlineEntry OutlineLevel="2" Description="BLOCK DIAGRAM"
      OutlineTarget="../FixedDoc.fdoc#PG_15_LNK_129"/>
    </DocumentOutline>
  </DocumentStructure.Outline>
</DocumentStructure>
```

INFORMATION PROCESSING METHOD AND APPARATUS FOR BANNER PRINTING

BACKGROUND OF THE INVENTION

1. Field of the Invention

The present invention relates to an information processing apparatus which controls print processing for a printer on the basis of a print instruction from an application, a control method therefor, and a program.

2. Description of the Related Art

When printing, from an application, a file such as a document or graphics created on a computer, the printer driver is generally used to convert rendering data into a printer language and transmit the converted data to a printer. The user makes print settings such as the paper type, double-sided printing, color, and paper source via a user interface provided by an application or printer driver. The print settings are transmitted as a command to a printer.

The result of processing executed by an application is sometimes transmitted in print settings to a printer driver or printer. For example, the application executes imposition layout processing for booklet printing, and the printer executes saddle stitching. To execute saddle stitching, the printer driver or printer generally performs imposition layout processing for booklet printing.

The printer driver or printer often adopts inhibition processing which inhibits designation of saddle stitching unless imposition layout processing for booklet printing is executed. Thus, if the application executes imposition layout processing for booklet printing, imposition layout processing is executed twice by the application and printer, or no saddle stitching is performed. As a popular measure against this, it is described in print settings that the application has already completed imposition layout processing for booklet printing. The printer driver or printer executes only saddle stitching on the basis of the print settings.

When the application designates N-up printing (to reduce a plurality of pages into one page and print), the printer driver or printer is sometimes to count the number of document pages actually laid out on one sheet. Also in this case, it is general to describe, in print settings, the number of document pages actually laid out on one sheet by the application.

Print setting data take two formats: a DEVMODE structure which is a conventional binary format, and a job ticket or Print Ticket which is an XML format in a markup language. The latter format allows more freely expanding data and changing descriptions. Print Ticket makes it easier to describe not only print settings but also the result of processing executed by an application.

By exploiting the feature of Print Ticket, a banner (application banner) generated by an application is generally defined. The banner is used as a break between print data. One banner is added to the start of a print job by an OS, printer driver, or printer, and printed. The banner mainly describes the name of a user who has generated a print job, the time, and the like. The banner is used as a break page (banner page) to prevent mixture of print jobs in a printer or the like shared between a plurality of users.

It should be prevented to enable the finishing and layout functions for a banner page together with data of the remaining pages of a print job. For example, if a banner page is stapled together with the remaining pages of a print job, the unnecessary banner page is attached as a cover though the user wants to staple only the pages of data of the actual print job. If imposition layout processing for booklet printing is executed for the pages of a print job including a banner page, the page order shifts by one page from a page order the user intends. The banner page is used as merely a break between print jobs, and only inserted between jobs. The form of a conventional banner page is described in, for example, Japanese Patent Laid-Open No. 2002-328786.

When generating a banner page by an OS, printer driver, or printer, data available as the banner page is only a small amount of information such as the user name and job name. In practice, an application which generates a print job has a large amount of information. When the application generates a banner page, a banner page using a large amount of information can be generated.

As described above, the finishing and layout functions need to be disabled for a banner page. If it can be declared that a page designated in print settings is a banner page, the printer driver and printer can recognize the banner page. In this case, the application can generate a banner page, that is, application banner. Print Ticket defines this as JobPrimaryBannerSheet in Microsoft Windows® (Print Schema Specification: see the website at microsoft.com in the subdirectory printschema.mspx in the subdirectory xps in the subdirectory whdc).

JobPrimaryBannerSheet can be selected from three choices: Standard (add a banner by a printer), Custom (use a page designated by an application as a banner), and None (add no banner). When Custom is designated, a page serving as a banner page needs to be explicitly described in Print Ticket. Since a page generated by an application can be described in Print Ticket so that the page can be regarded as a banner page, an application banner can be implemented.

However, the above-mentioned conventional technique provides a banner function of generating a banner page by an application or printer, but does not propose a banner function of generating a banner page by a printer driver. Since Print Ticket allows freely expanding a function, a banner function for the printer driver can be uniquely added. However, if the banner function is uniquely expanded, an application, another printer driver, and a printer cannot recognize it.

From this, Microsoft Windows Vista has introduced an XPSDrv printing system which is a new printer driver architecture. In the XPSDrv printing system, an XPS file, which is also used as a document file format, is used as the spool format of a print job. The XPS file is a file format used as a document file as well. Thus, if the printer driver itself adds a banner, an application and another printer driver cannot recognize the banner upon opening an XPS file. The banner is finished and laid out together with the pages of a print job.

SUMMARY OF THE INVENTION

The present invention has been made to overcome the conventional drawbacks, and provides an information processing apparatus capable of causing a banner setting made during print processing to function normally, a control method therefor, and a program.

According to the first aspect of the present invention, an information processing apparatus which controls print processing for a printer on the basis of a print instruction from an application, the apparatus comprises: a setting unit adapted to make print settings including a setting item for generating a banner sheet for banner printing by a printer driver of the printer; a print setting information generation unit adapted to, when a setting corresponding to the setting item is made, cause the printer driver to generate, in accordance with the setting, print setting information including information representing that a banner sheet is to be generated; a generation unit adapted to cause the printer driver to generate, based on the print setting information generated by the print setting information generation unit, banner data for generating a banner sheet; and a describing unit adapted to cause the printer driver to additionally describe, in the print setting information, information for using the banner data generated by the generation unit as banner data for print data, printing of which is designated by the application.

In one embodiment, the print setting information generation unit generates, by using a print setting used to generate a banner sheet by the application, the information representing that a banner sheet for banner printing is to be generated.

In one embodiment, the print setting information generation unit generates, by using a specific character string, the information representing that a banner sheet is to be generated.

In one embodiment, the setting item includes a first setting item for setting a banner page for a print job generated to print the print data, a second setting item for setting a banner page for print data of a designated document in print data for printing a plurality of documents included in the print job, and a third setting item for, when a setting corresponding to the first setting item is made, setting a designation method for designating attribute information of a document to be printed by the print job.

In one embodiment, when the setting corresponding to the first setting item is made, the generation unit acquires attribute information of the print job in accordance with the setting from an operating system running on the information processing apparatus, acquires attribute information included in the print data, and generates banner data based on the pieces of attribute information.

In one embodiment, when a setting corresponding to the second setting item is made, the generation unit acquires attribute information included in the print data in accordance with the setting, and generates banner data based on the attribute information.

In one embodiment, the information representing that a banner sheet is to be generated includes information in which page designation of a banner sheet is blank.

In one embodiment, the information representing that a banner sheet is to be generated includes information in which a specific character string is described in page designation of a banner sheet.

According to the second aspect of the present invention, a method of controlling an information processing apparatus which controls print processing for a printer on the basis of a print instruction from an application, the method comprises: a setting step of making print settings including a setting item for generating a banner sheet for banner printing by a printer driver of the printer; a print setting information generation step of, when a setting corresponding to the setting item is made, causing the printer driver to generate, in accordance with the setting, print setting information including information representing that a banner sheet is to be generated; a generation step of causing the printer driver to generate, based on the print setting information generated in the print setting information generation step, banner data for generating a banner sheet; and a describing step of causing the printer driver to additionally describe, in the print setting information, information for using the banner data generated in the generation step as banner data for print data, printing of which is designated by the application.

According to the third aspect of the present invention, a printer driver program which is stored in a computer-readable medium and causes a computer to control print processing for a printer on the basis of a print instruction from an application, the program causes the computer to execute a setting step of making print settings including a setting item for generating a banner sheet for banner printing by a printer driver of the printer, a print setting information generation step of, when a setting corresponding to the setting item is made, causing the printer driver to generate, in accordance with the setting, print setting information including information representing that a banner sheet is to be generated, a generation step of causing the printer driver to generate, based on the print setting information generated in the print setting information generation step, banner data for generating a banner sheet, and a describing step of causing the printer driver to additionally describe, in the print setting information, information for using the banner data generated in the generation step as banner data for print data, printing of which is designated by the application.

Further features of the present invention will be apparent from the following description of exemplary embodiments with reference to the attached drawings.

BRIEF DESCRIPTION OF THE DRAWINGS

FIG. 5 is a view showing an example of the description of Print Ticket according to the embodiment of the present invention;

FIG. 7 is a view showing an example of the description of Print Ticket according to the embodiment of the present invention;

FIG. 9 is a view showing an example of the description of core properties according to the embodiment of the present invention;

FIG. 10 is a view showing an example of the description of FixedPage according to the embodiment of the present invention;

FIG. 11 is a view showing an example of the description of FixedDocument according to the embodiment of the present invention;

FIG. 12 is a view showing an example of the description of DocumentStructure according to the embodiment of the present invention.

DESCRIPTION OF THE EMBODIMENT

An embodiment of the present invention will now be described in detail with reference to the drawings. It should be noted that the relative arrangement of the components, the numerical expressions and numerical values set forth in this embodiment do not limit the scope of the present invention unless it is specifically stated otherwise.

Figure 1:
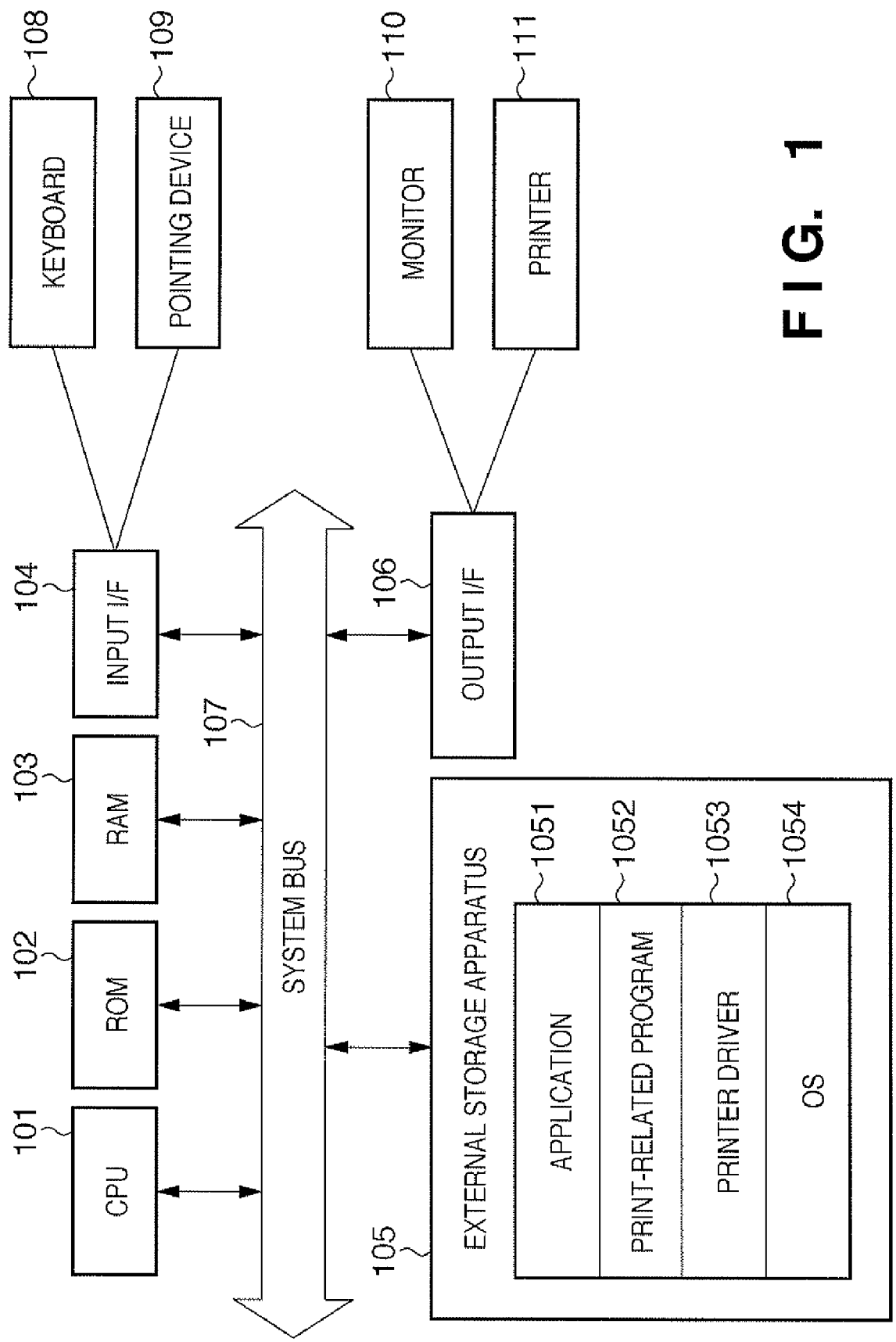
FIG. 1 is a block diagram showing the configuration of a print processing system according to an embodiment of the present invention.

FIG. 1 is a block diagram showing the configuration of a print processing system according to an embodiment of the present invention.

The present invention is applicable to a system formed from one or a plurality of devices, or a system connected via a network such as a LAN or WAN as long as the functions of the present invention are executed, unless otherwise specified.

FIG. 1 is a block diagram showing the configuration of a print processing system using a general computer (information processing apparatus). A CPU 101 controls the overall apparatus in accordance with a program stored in a ROM 102, RAM 103, or external storage apparatus 105. The RAM 103 is also used as a work area when the CPU 101 performs various processes.

The external storage apparatus 105 stores a variety of programs such as an application 1051, print-related program 1052, printer driver 1053, and operating system (OS) 1054. Input devices such as a keyboard 108 and pointing device 109 give various instructions from the user to the computer via an input I/F 104. An output I/F 106 is an interface for externally outputting data, and outputs data to a monitor 110 and printer 111. The printer 111 may be connected not only via a local I/O, but also via a network. A system bus 107 is a common data bus, and achieves data transmission/reception between various building components.

The configuration of an XPSDrv printing system implemented by Windows Vista will be explained with reference to FIG. 2.

Figure 2:
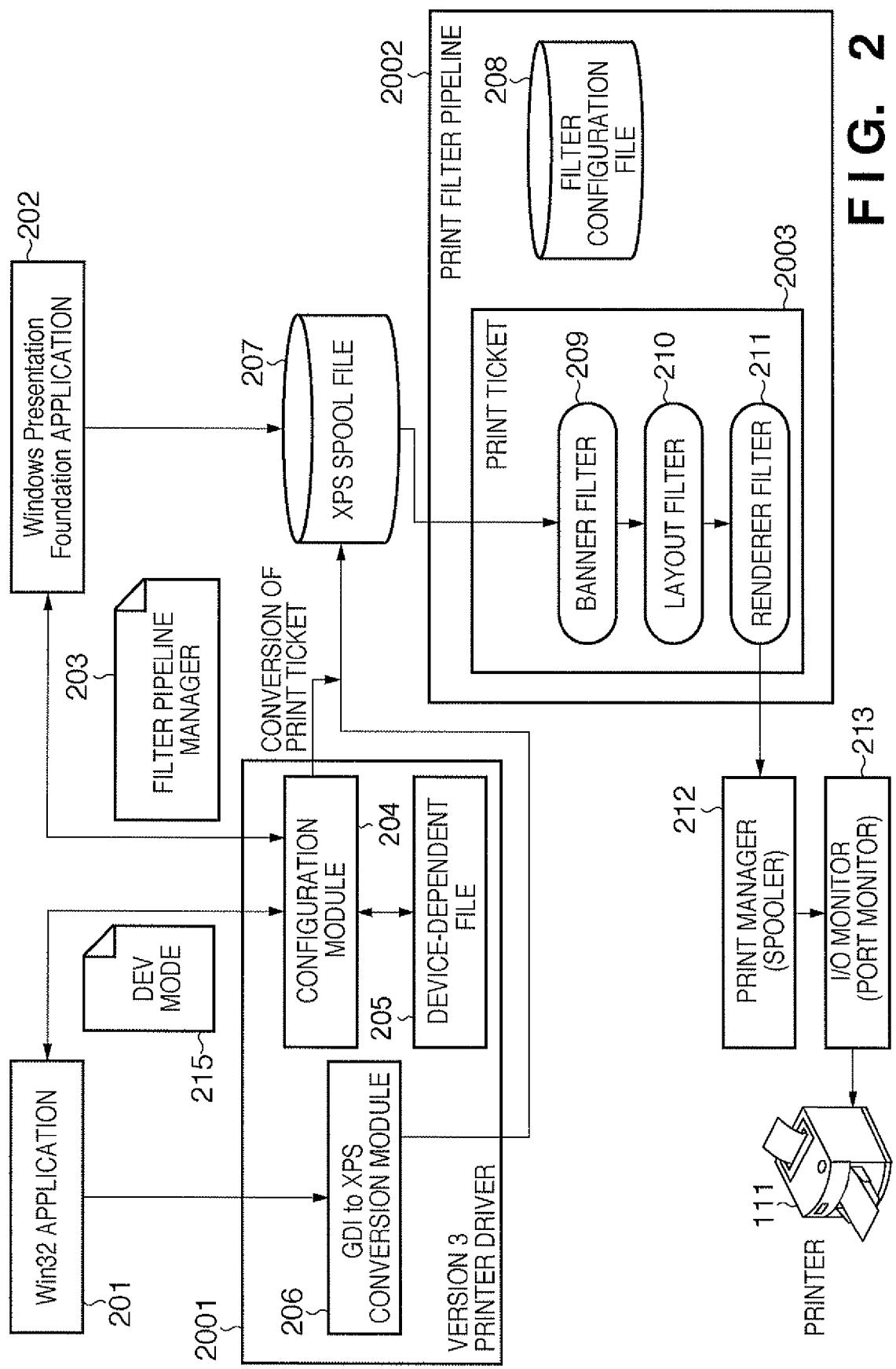
FIG. 2 is a block diagram showing the configuration of an XPSDrv printing system according to the embodiment of the present invention.

FIG. 2 is a block diagram showing the configuration of the XPSDrv printing system according to the embodiment of the present invention.

The user uses an input device such as the keyboard 108 or pointing device 109 to execute print processing via a GUI (Graphic User Interface) displayed on the monitor 110 serving as an output device. The GUI is provided by, for example, a Win32 application program (to be referred to as a Win32 application hereinafter) 201, or a Windows Presentation Foundation application program (to be referred to as a WPF application hereafter) 202. The print processing is executed by sequentially performing three processes: selection of a printer, creation of print settings, and conversion of rendering data.

First, a printer is selected. That is, a printer driver corresponding to a printer for printing is selected. The printer driver is a conventional one called a version 3 printer driver (to be referred to as a printer driver hereinafter) 2001. Although the printer driver 2001 is a conventional printer driver, it is expanded for the XPSDrv printing system to have a compliant interface, be compatible, and cope with a Print Ticket 203.

Then, print settings are made. As the print settings, a configuration module 204 of the printer driver 2001 creates print setting data by using a device-dependent file 205, and sends it to the Win32 application 201. As the print setting data, the Win32 application 201 uses a binary DEVMODE structure 215, and the WPF application 202 uses the Print Ticket 203.

The DEVMODE structure 215 or Print Ticket 203 holds print settings. The print settings can be directly rewritten by an application, and can also be rewritten by displaying the user interface of the printer driver 2001 held in the configuration module 204 and operating it by the user. Examples of the print settings are the output paper size "A4", double-sided printing, switching between color and monochrome, and designation of the paper source. The Print Ticket 203 is described in the XML format in a markup language, and thus can be easily rewritten directly by an application. However, settings may also be changed using the user interface of a conventional printer driver.

Finally, rendering data is converted. After print settings are finalized, the user executes print processing from an application.

When executing print processing from the Win32 application 201, rendering data is sent to a GDI to XPS conversion module 206 having the form of a version 3 printer driver, creating an XPS spool file 207. In this case, the GDI to XPS conversion module 206 calls the configuration module 204 to convert print settings from the DEVMODE structure 215 into the Print Ticket 203.

When executing print processing from the WPF application 202, two methods are available. According to one method, the WPF application 202 itself generates an XPS file. According to the other method, the operating system generates an XPS file in accordance with an instruction from the WPF application 202. In this case, either method generates the XPS spool file 207. In this manner, the XPSDrv printing system has a feature of always generating the XPS spool file 207 in printing.

After the XPS spool file 207 is generated, the process shifts to a print filter pipeline process 2002. The print filter pipeline process 2002 is a mechanism of printing via a plurality of filters. A filter configuration file 208 controls the number and order of filters.

A filter pipeline manager 2003 which runs in the print filter pipeline process 2002 executes processing using a plurality of filters in accordance with the filter configuration file 208. In the embodiment, the processing proceeds in the order of a banner filter 209, layout filter 210, and renderer filter 211. The processing is done by delivering the XPS spool file 207 to a filter. The filter processes the XPS spool file 207, and delivers it to the next filter. In this way, the processing proceeds.

Finally, the XPS spool file 207 is output in a printer control language (to be referred to as a PDL (Page Description Language) hereinafter) which is a data language interpretable by a printer. When the printer 111 can directly read the XPS spool file 207, the XPS spool file 207 need not be converted.

The banner filter 209 executes banner generation processing (banner generation processing for banner printing) in the printer driver 2001. The layout filter 210 executes processing associated with the layout including change of the copy ratio, the booklet imposition layout, and the stamp.

The banner filter 209 and layout filter 210 operate in accordance with the Print Ticket 203 serving as print settings included in the XPS spool file 207. When no banner setting exists in the Print Ticket 203, the banner filter 209 does not process the XPS spool file 207, and directly passes it to the next filter.

The final renderer filter 211 renders the XPS spool file 207 to convert it into PDL data. The PDL data is managed by a print manager 212 which manages the schedule of print processing. Print jobs are sequentially registered in the queue. When the printer 111 becomes printable, PDL data are transmitted via an I/O monitor 213 in an order in which they have been registered in the queue. The main role of the printer driver 2001 is to convert print data received from an application into the printer language. Then, actual print processing is performed.

The detailed structure of the XPS spool file 207 will be explained with reference to FIG. 3.

Figure 3:
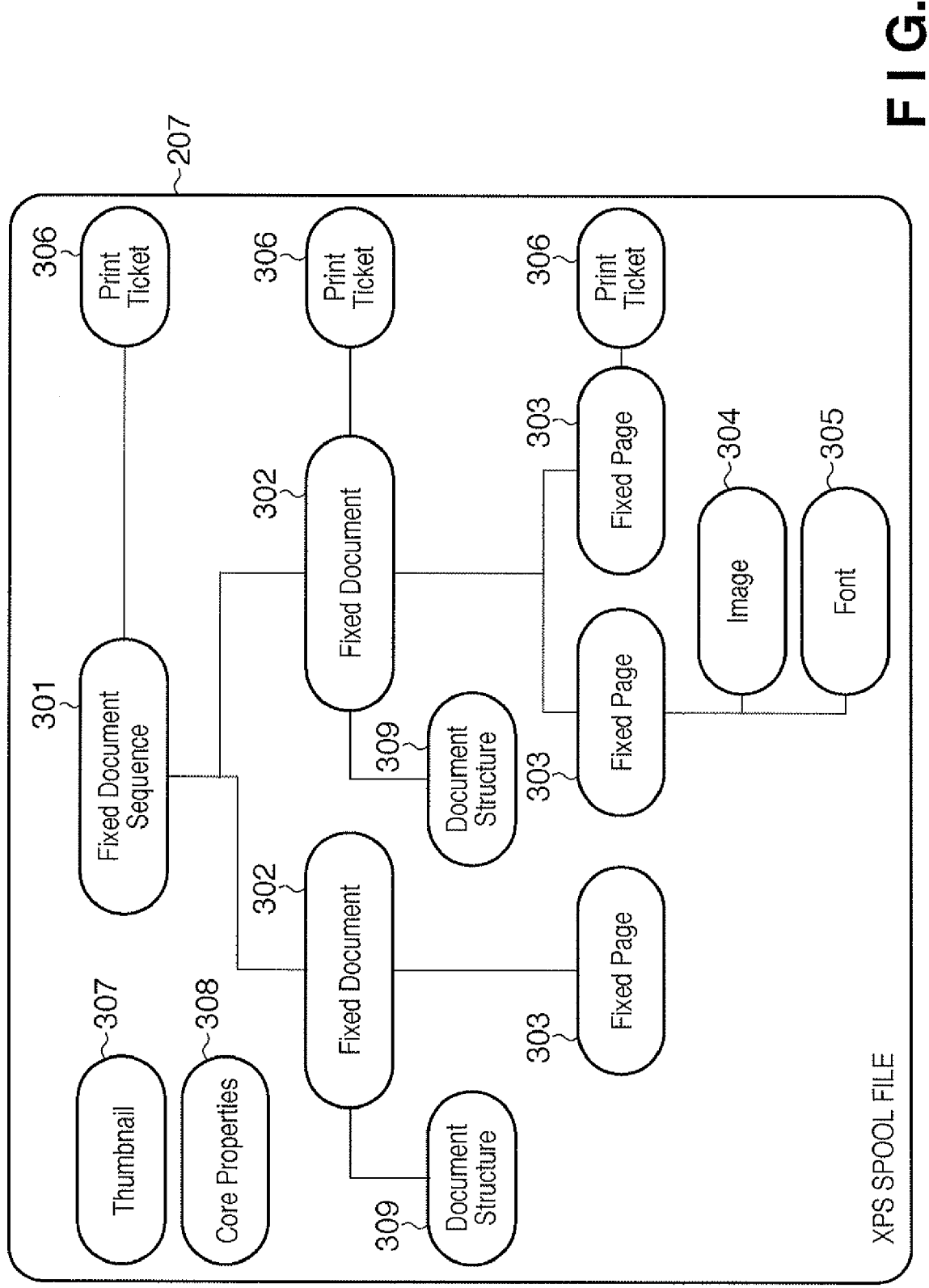
FIG. 3 is a view showing the structure of an XPS spool file according to the embodiment of the present invention.

FIG. 3 is a view showing the structure of the XPS spool file according to the embodiment of the present invention.

The XPS spool file 207 has a three-layered structure. More specifically, a Fixed Document Sequence (to be referred to as a job hereinafter) 301 exists on the first layer, a Fixed Document (to be referred to as a document hereinafter) 302 exists on the second layer, and a Fixed Page (to be referred to as a page hereinafter) 303 exists on the third layer. The XPS spool file 207 is formed from a set of three-layered XPS files. Each layer is also called a level (job level, document level, or page level).

Each page of a document serving as actual rendering data exists at the page level, and one document level includes a plurality of pages. Since one XPS spool file 207 can include a plurality of documents, a job manages a plurality of documents. All these documents are described in the XML language. Binary data such as resource data is included in the form of an image 304, font 305, or the like in the XPS spool file 207.

A Print Ticket 306 serving as print settings can be held at all the job, document, and page levels. The print settings can be switched between pages. A level to which each print setting function in the Print Ticket 306 is applied is described. The level is defined by the prefix of a function name. For example, "Job" prefixed to a function name means a job-level function setting.

In the Print Ticket 306, the function of a printer or printer driver is represented by a Feature tag, and a function choice is represented by an Option tag. ScoredProperty and Property are attribute information accessory to Option, and ParameterInit represents a function value.

A thumbnail 307 is the snapshot image file of the first page. By using this image, the user can see the page without rendering the page. The thumbnail 307 is, therefore, used in a list display of a plurality of XPS spool files 207. Core properties 308 represent document attribute (property) information, and include information such as the document name, revision, and editor. A Document Structure 309 is information at the document level, and describes the chapter break of a document.

These data are compressed into one file, generating the XPS spool file 207. Note that an XPS file in the document format also has the same structure as that of the XPS spool file 207.

A method of generating a banner page by the printer driver will be explained.

A banner setting is made in the Print Ticket 203. For example, this setting is made via a user interface implemented by the configuration module 204 of the printer driver 2001.

An example of the user interface will be explained with reference to FIG. 4.

Figure 4:
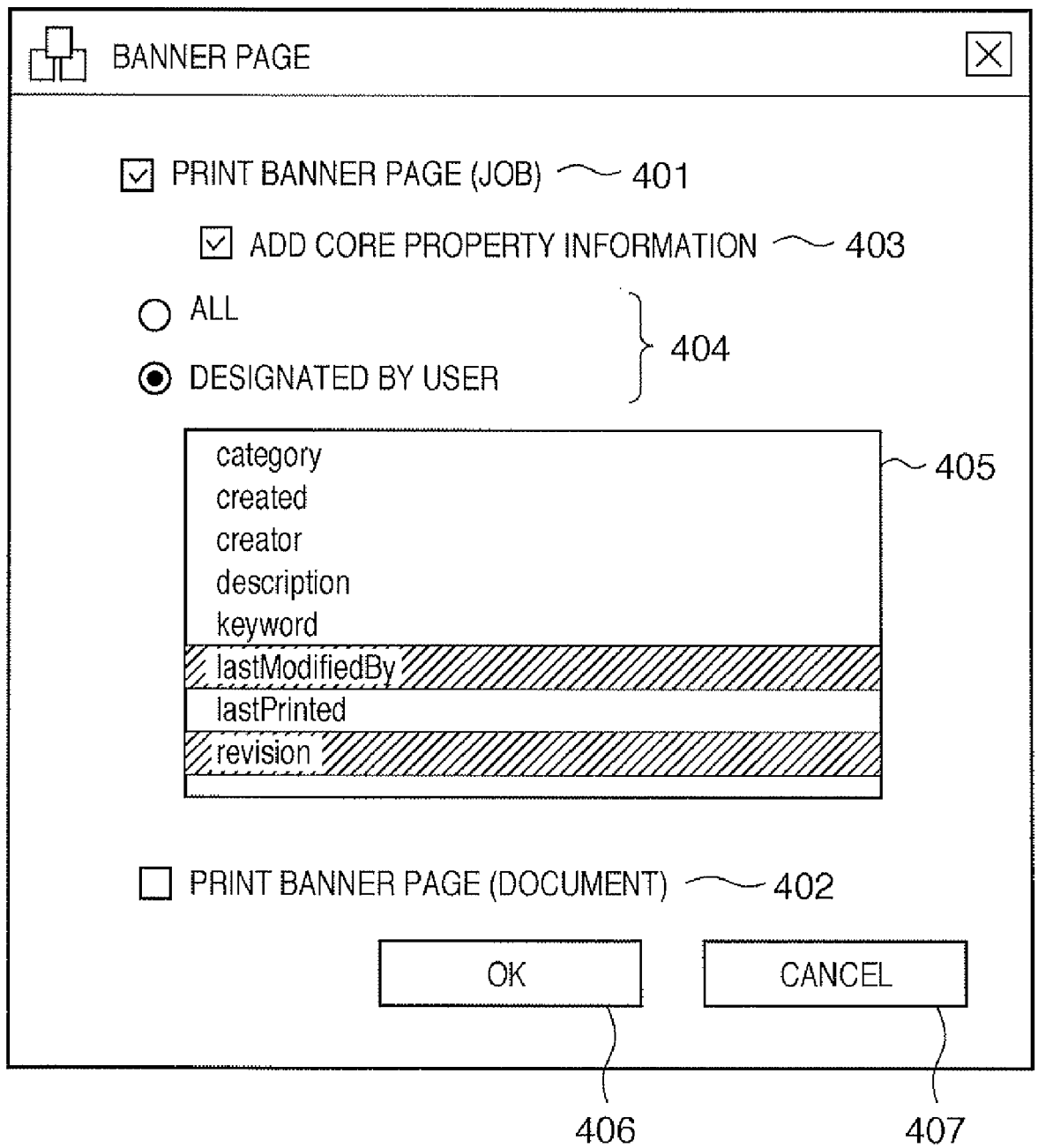
FIG. 4 is a view showing an example of a user interface implemented by a configuration module according to the embodiment of the present invention.

FIG. 4 is a view showing an example of the user interface implemented by the configuration module according to the embodiment of the present invention.

The configuration module 204 of the printer driver displays the user interface (banner setting dialog) on the basis of an operation from an application. The banner setting dialog has a check box 401 (first setting item) for setting a banner page for a job, and a check box 402 (second setting item) for setting a banner page for a document. FIG. 4 shows an example of setting a banner page for only a job.

To set a banner page for a job, the banner setting dialog provides a check box 403 (third setting item) for adding core property information as an option. To add core property information, the banner setting dialog provides a radio button 404 for selecting a designation method representing whether to add "all" property information or those "designated by user". When the user selects "designated by user", he can select desired property information from an area 405 displaying a list of pieces of property information which can be added.

In FIG. 4, it is set by the check box 403 to print even core property information on a banner sheet. Two, "lastModifiedBy" and "revision" are selected as core property information designated by the user.

Upon completion of settings, the user presses an OK button 406 to finalize the settings. The settings are stored in a memory (e.g., the RAM 103) as print setting information (Print Ticket) including the banner page setting information. The OK button 406 functions as a print setting information generation unit. If the user presses a cancel button 407, the settings are canceled.

An example of the description of Print Ticket created in accordance with the settings will be explained with reference to FIG. 5.

FIG. 5 is a view showing an example of the description of Print Ticket according to the embodiment of the present invention.

In FIG. 5, "JobPrimaryBannerSheet" is designated as a function, and "Custom" is selected as a method. "Custom" is generally designated when the application generates and adds a banner, but in the embodiment, used as a driver banner setting. Hence, the description "JobPrimaryBannerSheetSource" which originally designates a banner page generated by an application remains blank.

More specifically, a line 501 is blank as <psf:Value xsi:type="xs:string"></psf:Value>. When the application adds a banner, this is described as, e.g., <psf:Value xsi:type="xs:string">/Documents/1/Pages/0.banner</psf:Value>.

Core properties are also designated by a function "JobPrimaryBannerSheetCoreProperties", and parallel-described in Print Ticket. "PrintingName" which is a text to be printed on a banner sheet is also described in Print Ticket. This anticipates localization of a banner sheet into many languages. Japanese is described for a Japanese printer driver, and English is described for an English printer driver.

The application executes print processing on the basis of Print Ticket created in the above-described way, thereby creating the XPS spool file 207. Then, the process shifts to the banner filter 209 of the print filter pipeline process 2002. The banner filter 209 has a stream mode in which the XPS spool file 207 is received directly as data of the file, and a reach mode in which the I/F is adjusted to facilitate access to the XPS spool file 207. Assume that the banner filter 209 in the embodiment is created in the stream mode in order to directly access the XPS spool file 207.

The banner processing operation of the banner filter 209 will be explained with reference to FIG. 6.

Figure 6:
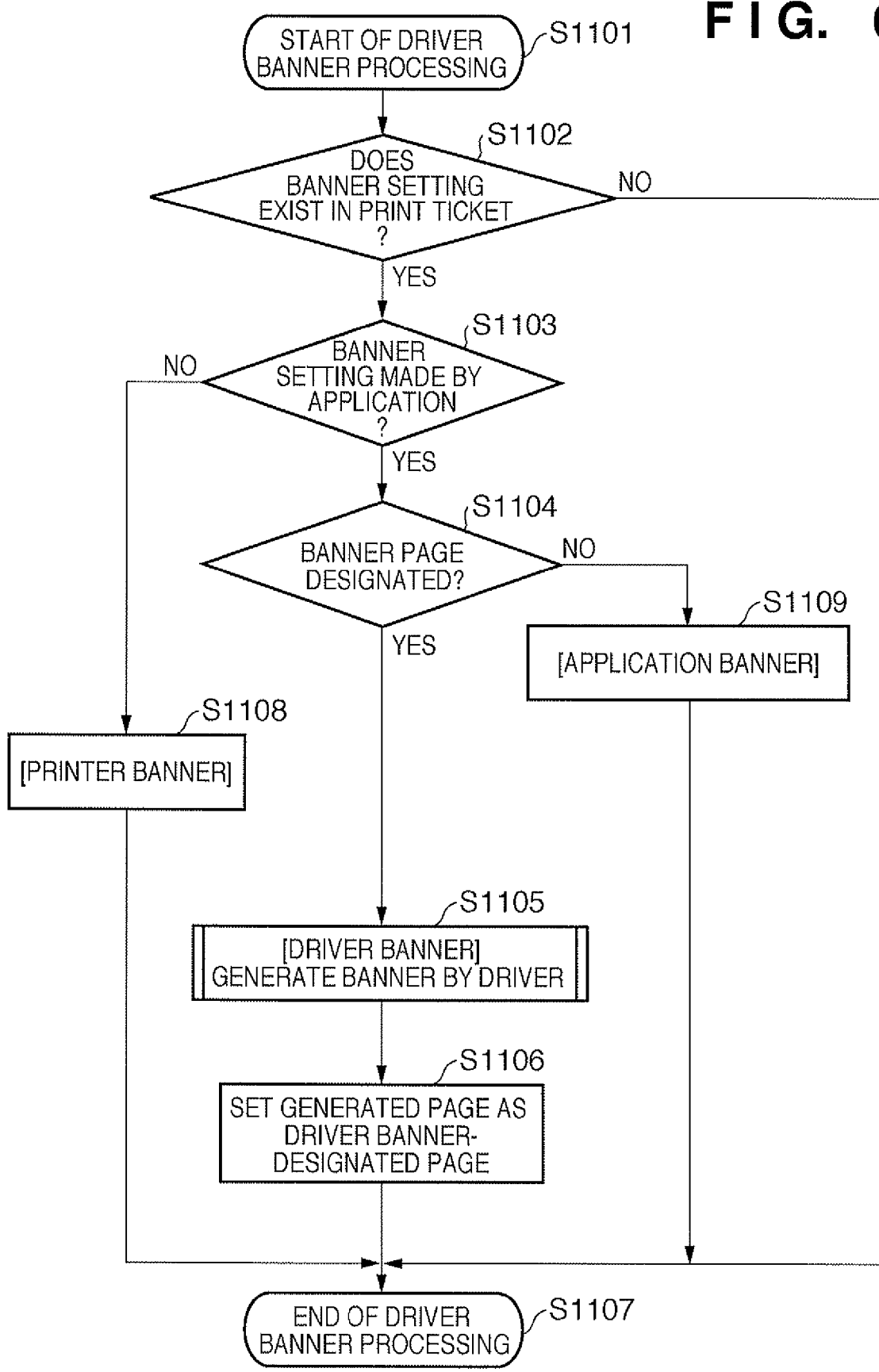
FIG. 6 is a flowchart showing a banner processing operation according to the embodiment of the present invention.

FIG. 6 is a flowchart showing the banner processing operation according to the embodiment of the present invention.

Upon receiving the XPS spool file 207, the banner filter 209 starts the process (step S1101). The banner filter 209 refers to the Print Ticket 203 included in the XPS spool file 207 to determine whether there is a banner setting and whether the banner setting is "None" (step S1102). In this case, whether the banner is a job-level one or document-level one does not matter.

If there is a banner setting (YES in step S1102), the banner filter 209 determines, as banner processing, whether the application has made the banner setting (step S1103). This determination is made based on which of "Standard" and "Custom" is set as the banner type. Particularly when the banner type is "Standard", the banner filter 209 determines that the banner is a printer banner to be added by the printer. When the banner type is "Custom", the banner filter 209 determines that the banner is an application banner to be added by the application or a driver banner to be added by the printer driver.

If the banner type is "Standard" (NO in step S1103), the banner filter 209 determines that the banner is a printer banner. The banner filter 209 skips the process without processing the XPS spool file 207, and delivers the XPS spool file 207 to a subsequent filter (step S1108).

If the banner type is "Custom" (YES in step S1103), the banner filter 209 determines that the banner is an application banner or driver banner, and determines whether a banner page is designated (step S1104). In this case, when a file name at the page level is designated for a banner page, the banner filter 209 determines that the banner is an application banner.

If a banner page is designated (YES in step S1104), the banner filter 209 determines that the banner is an application banner. The banner filter 209 skips the process without processing the XPS spool file 207, and delivers the XPS spool file 207 to a subsequent filter (step S1109).

If no banner page is designated (NO in step S1104), the banner filter 209 determines that the banner is a driver banner. The banner filter 209 executes driver banner generation processing to generate a banner page (step S1105). Details of the banner page generation processing will be described later.

After generating a banner page, the banner filter 209 additionally describes the position and file name of the generated banner page in the banner page designation (JobPrimaryBannerSheetSource) of Print Ticket (step S1106). Print Ticket in FIG. 7 represents a state in which the banner page designation is described in Print Ticket in FIG. 5. Then, the banner filter 209 ends the process, and delivers the XPS spool file 207 to a subsequent filter (step S1107).

Details of the banner page generation processing in step S1105 will be explained with reference to FIG. 8.

Figure 8:
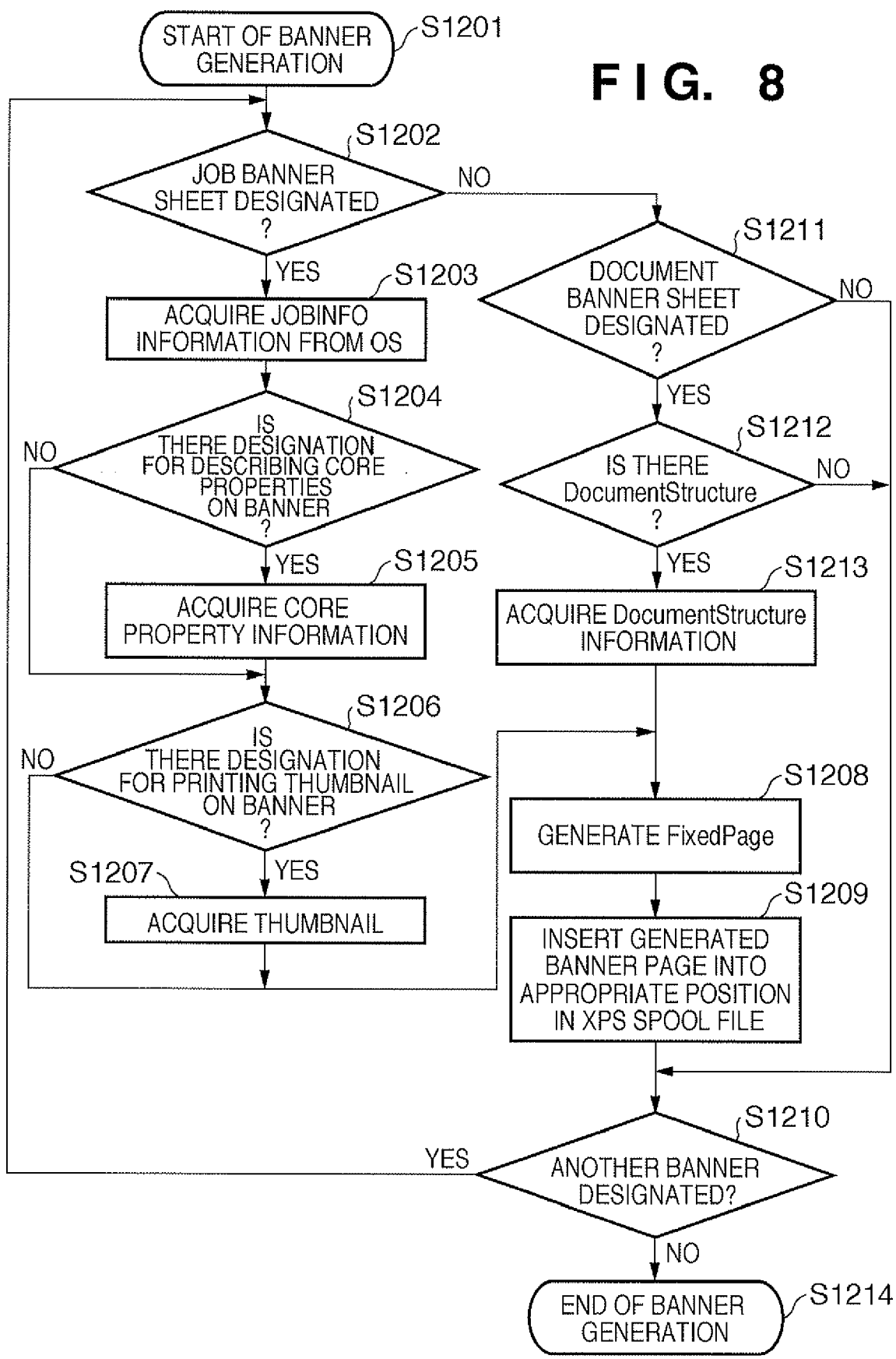
FIG. 8 is a flowchart showing details of banner page generation processing according to the embodiment of the present invention.

FIG. 8 is a flowchart showing details of the banner page generation processing according to the embodiment of the present invention.

The banner filter 209 starts the banner page generation processing (step S1201). The banner filter 209 determines which of a job banner sheet and document banner sheet is designated in the Print Ticket 203 (step S1202). In this case, the Print Ticket 203 determines that a job banner sheet is designated when "JobPrimaryBannerSheet" exists in the Print Ticket 203, and that a document banner sheet is designated when "DocumentBannerSheet" exists.

If a job banner sheet is designated (YES in step S1202), the banner filter 209 acquires, from the operating system, JOBINFO information to be described on the job banner sheet (step S1203). JOBINFO information is added to each print job, and includes a job ID, job name (document name), machine name, and user name.

The banner filter 209 determines whether the Print Ticket 203 includes a designation for describing, on a banner, the core properties of document information included in the XPS spool file 207 (step S1204). Print Ticket in FIG. 5 designates "JobPrimaryBannerSheetCoreProperties" to describe core property information on a banner.

If the Print Ticket 203 does not include a designation for describing core properties on a banner (NO in step S1204), the process advances to step S1206. If the Print Ticket 203 includes a designation for describing core properties on a banner (YES in step S1204), the banner filter 209 acquires core property information from the XPS spool file 207 (step S1205). The core properties are, for example, XML data in FIG. 9, and include document information such as the editor (lastModifiedBy), creator, and revision. Data designated by Print Ticket is acquired from document information of the core properties.

Thereafter, the banner filter 209 determines whether the Print Ticket 203 includes a designation for printing a thumbnail on a banner (step S1206). If the Print Ticket 203 does not include a designation for printing a thumbnail on a banner (NO in step S1206), the process advances to step S1208. If the Print Ticket 203 includes a designation for printing a thumbnail on a banner (YES in step S1206), the banner filter 209 acquires a thumbnail from the XPS spool file 207 (step S1207).

The core properties and thumbnail do not always exist. When the core properties and thumbnail do not exist in the XPS spool file 207, nothing is printed on a banner page even if printing of them is designated.

After acquiring various kinds of information, the banner filter 209 generates a banner page FixedPage (step S1208). FIG. 10 shows an example of the description of the generated FixedPage. Core property data is combined with PrintingName described in the Print Ticket 203 to generate a text.

The banner filter 209 inserts the generated banner page (banner data) into the XPS spool file 207 (step S1209). When the banner is a job banner, the banner filter 209 inserts the job banner before the first page of the first document among a plurality of documents. When the banner is a document banner, the banner filter 209 inserts the banner page before the first page of a designated document. When a job banner exists at the same time as a document banner, the banner filter 209 inserts the banner page of the document banner as a page next to the job banner. FIG. 11 shows an example of the description of FixedDocument when a banner page is inserted.

Then, the banner filter 209 determines whether the Print Ticket includes the designation of another banner (step S1210). If the Print Ticket includes the designation of another banner (YES in step S1210), the process returns to step S1210. If the Print Ticket does not include the designation of another banner (NO in step S1210), the banner generation processing ends.

If the banner filter 209 determines in step S1202 that no job banner sheet is designated (NO in step S1202), it determines whether a document banner sheet is designated (step S1211). If no document banner sheet is designated (NO in step S1211), the process advances to step S1210.

If a document banner sheet is designated (YES in step S1211), the banner filter 209 determines whether DocumentStructure exists in the XPS spool file 207 (step S1212).

DocumentStructure is, for example, structure data shown in FIG. 12, and is obtained by extracting only "chapter" data included in a document. Similar to the thumbnail and core properties, DocumentStructure does not always exist in the XPS spool file 207. When DocumentStructure exists, the data is acquired.

If no DocumentStructure exists (NO in step S1212), the process advances to step S1210. If DocumentStructure exists (YES in step S1212), the banner filter 209 acquires DocumentStructure information (step S1213). The banner filter 209 describes, on a document banner page, "chapter" data represented by the acquired DocumentStructure information.

When there are too many descriptions, only descriptions at a given OutlineLevel value or less are described. The document banner does not describe JOBINFO information, core property information, and thumbnail information. These pieces of information form one data in an entire job. When there is a plurality of documents, the same information is described on all document banners, and the banners do not function as page breaks. When no job banner is designated and the XPS spool file 207 includes only one document, JOBINFO information, core property information, and thumbnail information are described on a document banner as well.

After the end of processing by the banner filter 209, the process shifts to the layout filter 210. When there is a banner sheet, the layout filter 210 first transmits only the banner sheet to the next filter, and executes layout processing for the remaining pages.

When converting data into PDL command data, the renderer filter 211 creates a command by inserting a break "binder" into the command so that the printer can recognize that the current page is a single banner page. Then, the renderer filter 211 transmits the command to the printer.

Figure 13:
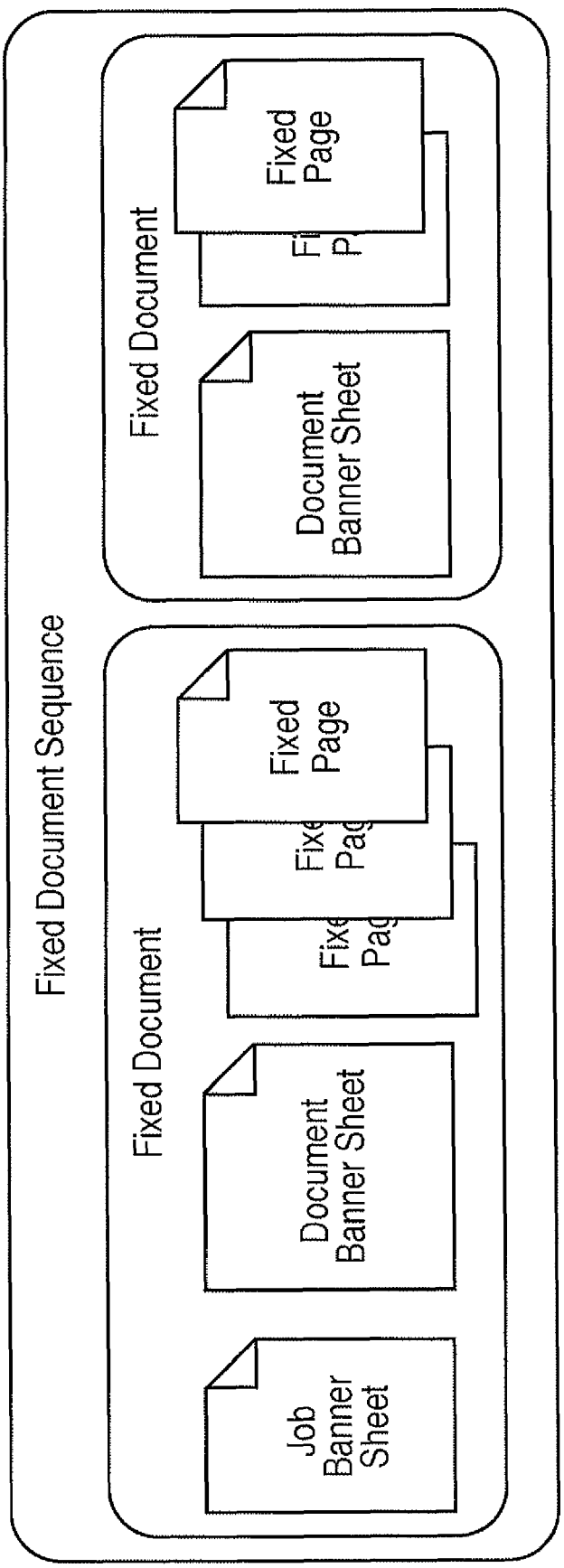
FIG. 13 is a view showing an example in which two, job and document banners are simultaneously set in an XPS spool file having a plurality of documents according to the embodiment of the present invention.

FIG. 13 exemplifies a case wherein two, job and document banners are simultaneously set in an XPS spool file having a plurality of documents.

In this fashion, the printer driver generates a banner sheet. The generated banner sheet seems the same as a banner sheet generated by an application in an XPS file. Even if a printer or another printer driver has the XPS file, the banner can be determined correctly.

In the embodiment, the banner sheet page description is set blank to represent that the banner is a driver banner, but the present invention is not limited to this. For example, a specific character string "ns0000: DriverBanner" is defined in advance. This specific character string is described in the banner sheet page description of Print Ticket to represent that the banner is a driver banner. In other words, any description is available as long as information representing a driver banner is obtained from Print Ticket.

As described above, according to the embodiment, the printer driver can generate a banner without changing the document file format. Even when an application or printer has an XPS file including a banner, the banner can be recognized and correctly output.

Even an XPS driver can generate a driver banner page similarly to a conventional driver. Even when the XPS driver outputs a banner in an XPS file, an application or another driver can recognize the XPS file as a banner-added XPS document.

Information described on a conventional banner page is the user name, time, and job name at most. However, not job information but original document information such as the document creator and revision can also be described, which is helpful to discriminate printed materials.

By adding a banner to each document, the printed materials of respective documents can be discriminated in an XPS file including multiple documents. The number of included documents can also be described on a job banner, so the number of documents included in one printing can also be recognized. Since the driver employs the banner filter, a driver which ignores a banner setting can be easily created by eliminating the filter.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-079213 filed on Mar. 25, 2008, which is hereby incorporated by reference herein in its entirety.

What is claimed is:

1. An information processing apparatus comprising:
a setting unit adapted to receive settings for generating a banner page for banner printing by a printer driver of a printer;
an acquisition unit adapted to acquire print setting information capable of including information representing a position of a banner page generated by an application;
a first describing unit adapted to, when said setting unit receives the settings for generating the banner page, describe, in print setting information, information representing that the printer driver generates a banner page;
a determination unit adapted to determine, after said acquisition unit acquires the print setting information, whether or not the print setting information includes information representing a position of the banner page;

a second describing unit adapted to, when said determination unit determines that the print setting information does not include information representing the position of the banner page and the print setting information includes information representing that the printer driver generates a banner page, generate the banner page and additionally describe, in the print setting information, information representing a position of the generated banner page; and a generation unit adapted to generate, when said determination unit determines that the print setting information includes information representing a position of a banner page, print data such that a banner page which is generated by the application is printed and a banner page which is generated by the print driver is not printed.

2. The apparatus according to claim 1, wherein a setting item set by said first describing unit comprises a first setting item for setting whether or not a banner page is generated for a print job generated to print the print data, a second setting item for setting whether a banner page for each of a plurality of documents included in the print job, and a third setting item for, when a setting corresponding to the first setting item is made, setting a designation method for designating attribute information of core property of an XPS of a document to be printed by the print job.

3. The apparatus according to claim 2, wherein when the second setting item is set, said second describing unit generates banner pages for the plurality of documents.

4. The apparatus according to claim 2, wherein when the first setting item and the second setting item are set, said second describing unit generates both a banner page for the print job and a banner page for print data of the document.

5. The apparatus according to claim 2, wherein said second describing unit describes thumbnail information in a banner page for print data of the document.

6. A method of controlling an information processing apparatus, the method comprising:

a setting step of receiving settings for generating a banner page for banner printing by a printer driver of a printer;

an acquisition step of acquiring print setting information capable of including information representing a position of a banner page generated by an application;

a first describing step of, when said setting step receives the settings for generating the banner page, describing, in print setting information, information representing that the printer driver generates a banner page;

a determination step of determining, after said acquisition step acquires the print setting information, whether or not the print setting information includes information representing a position of the banner page;

a second describing step of, when said determination step determines that the print setting information does not include information representing the position of the banner page and the print setting information includes information representing that the printer driver generates a banner page, generate the banner page and additionally describe, in the print setting information, information representing a position of the generated banner page; and a generation step of generating, when said determination step determines that the print setting information includes information representing a position of a banner page, print data such that a banner page which is generated by the application is printed and a banner page which is generated by the print driver is not printed.

7. A non-transitory computer-readable medium on which is stored a printer driver program which causes a computer to control print processing for a printer on the basis of a print instruction from an application, the program causing the computer to execute:

a setting step of receiving settings for generating a banner page for banner printing by a printer driver of a printer;

an acquisition step of acquiring print setting information capable of including information representing a position of a banner page generated by an application;

a first describing step of, when said setting step receives the settings for generating the banner page, describing, in print setting information, information representing that the printer driver generates a banner page;

a determination step of determining, after said acquisition step acquires the print setting information, whether or not the print setting information includes information representing a position of the banner page;

a second describing step of, when said determination step determines that the print setting information does not include information representing the position of the banner page and the print setting information includes information representing that the printer driver generates a banner page, generate the banner page and additionally describe, in the print setting information, information representing a position of the generated banner page; and a generation step of generating, when said determination step determines that the print setting information includes information representing a position of a banner page, print data such that a banner page which is generated by the application is printed and a banner page which is generated by the print driver is not printed.

8. The apparatus according to claim 1, wherein the printer driver executes said first describing unit, said determination unit and said second describing unit.

9. The apparatus according to claim 1, wherein the print setting information is information which can be recognized by the application.

* * * * *